United States Patent Office 3,312,151
Patented Apr. 4, 1967

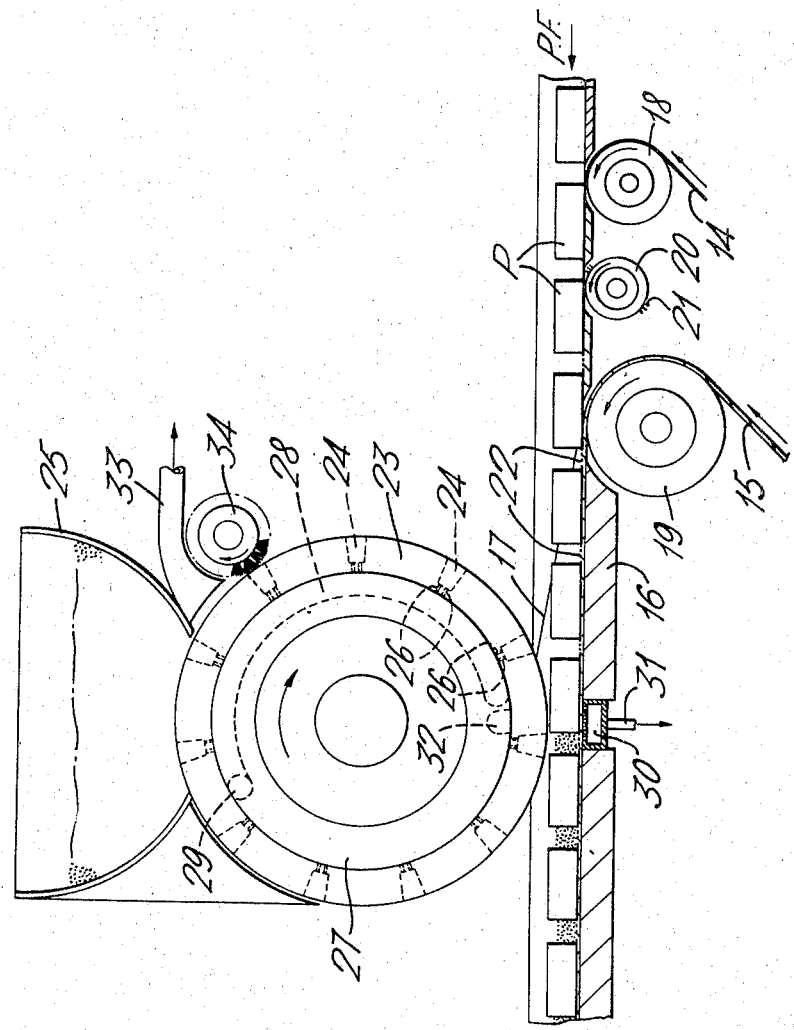

3,312,151
APPARATUS FOR MANUFACTURING COMPOSITE FILTER PLUGS
Desmond Walter Molins, London, England, assignor to The Molins Organisation Limited, London, England, a corporation of Great Britain
Filed Oct. 1, 1964, Ser. No. 400,753
Claims priority, application Great Britain, Oct. 8, 1963, 39,655/63
7 Claims. (Cl. 93—1)

This invention relates to apparatus for manufacturing composite filter plugs and more particularly to apparatus for the manufacture of composite filter rod containing portions of powdered filter material.

Present-day cigarette-making machines are capable of operation at high speeds, e.g. 2,000 cigarettes per minute, hence when filter-tipped cigarettes are to be made there is a demand for apparatus capable of manufacturing filter plugs at correspondingly high speeds. When it is desired to include portions of powdered filter material, e.g. granules of activated carbon, in such filter plugs, it appears simplest to form a stream of conventional filter plugs with gaps between successive plugs at regular intervals, and then allow an appropriate quantity of powdered filter material to fall into each gap. However, it can be calculated that the descent of the powder into a gap will take such a time as to raise problems in a high-speed machine. With typically-sized conventional plugs and reasonably complete filling of the gaps, the time required for powder to fall from above into the gap will be approximately 40 milliseconds and for reliable operation probably 50 milliseconds needs to be allowed. Thus clearly, only 1200 gaps per minute can be filled; at this rate of operation more than one filter plug making machine will be needed for each cigarette-making machine.

An improvement can be effected by transferring the powder to the gaps by means of an endless flexible band having pockets at intervals and arranged to have a lower run in which the pockets travel above the gaps between plugs, so that the whole time taken by a pocket to traverse said lower run is available for descent of the powder. In such apparatus there may be, say, three or four pockets in the lower run at any instant and hence the rate of filling may be 3600 or 4800 gaps per minute. This expedient is adopted in the forms of apparatus disclosed in British patent applications Nos. 39,207/63 and 39,658/63. It will however be obvious that the increased rate of production is obtained at the expense of a somewhat larger and more complex apparatus.

It is an object of the present invention to provide apparatus for the manufacture of composite filter rod containing portions of powdered filter material which, while capable of relatively high operating speed, is yet relatively compact and simple.

According to the invention, therefore, there is provided apparatus for manufacturing composite filter rod containing portions of powdered filter material, comprising a powder hopper, a rotatable transfer member having pockets arranged to receive powder from said hopper, means for feeding a stream of filter plugs with gaps between successive plugs at regular intervals on to a continuous wrapper and feeding said wrapper, carrying said plugs, beneath said transfer member, and means for rotating said transfer member in synchronism with the feeding of said plugs so that as each gap passes beneath the transfer member one of the pockets is travelling immediately above that gap, including means for perforating the wrapper below each gap before the gap passes beneath the transfer member and means for applying suction to each gap through the perforated wrapper as that gap passes beneath the transfer member so as to accelerate movement of powdered filter material from the pockets to the gaps.

The transfer member preferably comprises a wheel or drum rotatable about a horizontal axis and has its pockets in its curved i.e. peripheral surface; such a transfer member requires to be provided with means for retaining the powder in each pocket as it travels from the hopper down towards the stream of plugs and we prefer to provide means for applying suction through the base of each pocket while it travels below the hopper and until immediately before it reaches the position at which the powder is to be allowed to fall into a gap, i.e. at which the pocket faces vertically downwards.

It is also preferred to provide means for cleaning the surface of the transfer member after it has passed under the hopper, and such means may comprise a suction nozzle followed by a rotary brush arranged to sweep powder or dust lying on the said surface towards said nozzle.

To assist in a full understanding of the invention, one preferred embodiment thereof will now be described in some detail, referring to the accompanying drawing which shows the essential parts thereof in part-sectional side elevation.

A stream of conventional filter plugs P is fed in regularly-spaced succession by any convenient means, as indicated by arrow PF, on to a continuous paper wrapper 14 which in turn is fed on to a conveyor belt 15, made of air-previous material for a reason to be explained. The belt 15 is supported by and travels across a base-plate 16 carrying folding blades (not visible in the drawing) which serve first to curve the belt 15 and wrapper 14 to a U form as indicated at 17 and later (beyond the left-hand edge of the drawing) to produce further folding so that the wrapper becomes a tube enclosing plugs P, the wrapper then being conventionally sealed by any convenient means (not shown) to form a finished filter rod.

The wrapper 14 and belt 15 are guided on to the base-plate 16 around spaced pulleys 18, 19 respectively, and between said pulleys is mounted a perforator wheel 20. The wheel 20 carries two groups of perforator spikes 21 at opposed positions on its circumference and is so mounted below the path of the wrapper 14 that once in each half revolution of the wheel 20 one of the groups of spikes 21 engages and pierces said wrapper so that the latter thereafter has groups of perforations 22 regularly spaced along its length. The plug feeding means, wrapper 14, belt 15, and wheel 20 are all driven by a common prime mover (not shown) and the circumference of the wheel 20 is equal to the centre-to-centre spacing of successive plugs P. Spikes 21 are so placed on wheel 20 that the wrapper 14 is pierced only in the areas below the gaps separating successive plugs P. (The number of groups of spikes 21 required on wheel 20 depends, of course, on the size of wheel 20 relative to the spacing of said gaps.)

Above the base-plate 16 and the path of plugs P, at a position where the folding of the wrapper 14 has brought it to a substantially U section, a transfer wheel 23 is carried on a horizontal shaft extending at right angles to the length of the belt 15, the height of the shaft and the radius of wheel 23 being so chosen that the lowest point of the wheel 23 lies immediately above the stream of plugs P. The wheel 23 has pockets 24 regularly spaced around its circumference, the spacing of adjacent pockets being equal to the centre-to-centre spacing of successive plugs P, and wheel 23 is driven from the common prime mover (not shown) so that each pocket 24 passes the lowest point of said wheel 23 as a gap between plugs P is passing thereunder, both pocket and gap moving from right to left as seen in the drawing.

Above wheel 23 is a powder hopper 25 with a discharge opening in its base which is closed by said wheel 23. As the wheel is rotated, each pocket 24 passes under the discharge opening of the hopper and fills with powder, then carries said powder round to the lowest point of the wheel where the powder falls into the gap between plugs P which passes at the same time. The powder is retained in each pocket 24, as it travels round with the wheel, by atmospheric pressure. This is achieved by applying suction to the base of each pocket 24, through drillings 26 in the base of each pocket. Within the wheel 23 is a stationary member 27 which is grooved over part of its circumference to form a suction chamber 28 with which drillings 26 communicate as their pockets 24 pass below hopper 25 and travel to a point immediately before the lowest point of the wheel, chamber 28 being connected by a conduit 29 to a suction pump (not shown). As each pocket 24 reaches said lowest point, however, its drillings 26 no longer communicate with chamber 28 and the powder within the pocket may fall into the gap between plugs P which will be passing below the pocket.

The fall of the powder into the gap under gravity alone may be too slow to permit high-speed operation of the apparatus, however. To accelerate the transfer of powder from each pocket 24 to the corresponding gap, directly under the lowest point of wheel 23 a suction box 30 is provided in an opening in base-plate 16. Said box 30 has a perforated top surface lying flush with the top surface of the base-plate and its underside is provided with a conduit 31 leading to a suction pump (not shown). While each gap between successive plugs P lies below the lowest point of the wheel 23, the suction applied to box 30 will be effective to draw air through said gap, through the perforations 22 in the wrapper 14 and the air-pervious belt 15. This air-current speeds up the transfer of powder from each pocket 24 to the gap below it as both pass the lowest point of wheel 23.

If desired, a groove 32 extending parallel to the axis of wheel 23 may be provided in the stationary member 27 within wheel 23, to provide communication between the ambient air and the drillings 26 of each pocket 24 as the latter passes the lowest point of the wheel; this permits a substantial part of the air-stream induced by the suction applied to the box 30 to pass through the pocket 24 which further assists in obtaining a quick transfer of powder from the pocket to the gap between plugs P.

It may also be desirable to provide means for cleaning the circumferential surface of the wheel 23 as it leaves the hopper 25, as fine particles of the powder may adhere to such surface and, if allowed to remain there, ultimately reach undesired destinations e.g. the outside of the wrapper 14 in the finished rod. Such cleaning means may conveniently comprise a suction nozzle 33, placed over but spaced from the surface of wheel 23 as it leaves hopper 25; the spacing of the nozzle 33 from the wheel's circumferential surface is so selected in relation to the suction applied through said nozzle that a sufficient air-current is created over the wheel's surface to remove loose particles but any tendency to draw powder out of pockets 24 is avoided. After passing nozzle 33, the surface of the wheel travels under a rotary brush 34, arranged to dislodge any particles still adhering to the wheel's surface and sweep such particles back into the air-current produced by the suction nozzle 33 for removal through the latter.

While the above description and accompanying drawing disclose a preferred embodiment of the invention, it will be understood that various changes or modifications may be made in the several details of the apparatus without departing from the scope of the invention.

I claim:

1. Apparatus for manufacturing composite filter rod containing portions of powdered filter material, comprising a powder hopper, a rotatable transfer member having pockets arranged to receive powder from said hopper, means for feeding a stream of filter plugs with gaps between successive plugs at regular intervals on to a continuous wrapper and feeding said wrapper, carrying said plugs, beneath said transfer member, and means for rotating said transfer member in synchronism with the feeding of said plugs so that as each gap passes beneath the transfer member one of the pockets is travelling immediately above said gap, including means for perforating the wrapper below each gap before the gap passes beneath the transfer member and means for applying suction to each gap through the perforated wrapper as that gap passes beneath the transfer member so as to accelerate movement of powdered filter material from the pockets to the gaps.

2. Apparatus as claimed in claim 1 in which the perforating means comprises a perforator wheel having at least one group of spikes on its circumference, said perforator wheel being mounted for rotation adjacent to the path of the wrapper so that each group of spikes pierces said wrapper during each revolution of said perforator wheel.

3. Apparatus as claimed in claim 2 in which the transfer member comprises a wheel rotatable about a horizontal axis and having its pockets in its peripheral surface.

4. Apparatus as claimed in claim 3, in which said wheel is provided with means for retaining the powder in each pocket as such pocket travels from the hopper down towards the stream of plugs.

5. Apparatus as claimed in claim 4 in which the powder-retaining means comprises means for applying suction through the base of each pocket while such pocket travels below the hopper and until immediately before it reaches the position at which that pocket faces vertically downwards.

6. Apparatus as claimed in claim 5, including means for cleaning the peripheral surface of the transfer member after it has passed under the hopper.

7. Apparatus as claimed in claim 6 in which the cleaning means comprises a suction nozzle followed by a rotary brush arranged to sweep powder lying on said peripheral surface towards said nozzle.

References Cited by the Examiner
UNITED STATES PATENTS

| | | | |
|---|---|---|---|
| 2,381,454 | 8/1945 | Huth | 141—59 |
| 3,259,029 | 7/1966 | Hall et al. | 93—1 |

BERNARD STICKNEY, *Primary Examiner.*